(12) United States Patent
Dupont

(10) Patent No.: US 6,358,547 B1
(45) Date of Patent: Mar. 19, 2002

(54) PREPARATION OF MULTI-COLORED PRODUCTS WITH A PROCESS WHICH INCLUDES EXTRUSION

(75) Inventor: Christophe Dupont, Salouel (FR)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,088

(22) Filed: Jul. 27, 2000

Related U.S. Application Data

(63) Continuation-in-part of application No. 09/010,358, filed on Jan. 21, 1998, now Pat. No. 6,001,402, which is a continuation-in-part of application No. 09/208,531, filed on Dec. 9, 1998, now Pat. No. 6,145,433.

(30) Foreign Application Priority Data

Jan. 22, 1997 (EP) ............................................. 97200167

(51) Int. Cl.⁷ .............................. A23L 1/27; A23B 1/00; A23P 1/12
(52) U.S. Cl. ........................ 426/249; 426/250; 426/448; 426/509; 426/510; 426/513; 426/516; 264/75; 264/78; 264/245
(58) Field of Search ................................ 426/249, 250, 426/513, 516, 448, 449, 802, 509, 510; 425/183, 238, 464, DIG. 243; 264/75, 78, 245

(56) References Cited

U.S. PATENT DOCUMENTS

| | | | |
|---|---|---|---|
| 3,903,315 A | 9/1975 | Giles et al. | 426/388 |
| 4,044,661 A | 8/1977 | Balaz | 99/355 |
| 4,235,935 A | 11/1980 | Bone et al. | 426/249 |
| 4,310,558 A | 1/1982 | Nahm, Jr. | 426/98 |
| 4,358,468 A | 11/1982 | Dolan et al. | 426/250 |
| 4,454,804 A | 6/1984 | McCulloch | 99/348 |
| 5,019,404 A | 5/1991 | Meisner | 426/249 |
| 5,165,949 A | 11/1992 | Farnsworth et al. | 426/496 |
| 5,458,900 A | 10/1995 | Rubio et al. | 426/512 |
| 5,538,748 A | 7/1996 | Boatman et al. | 426/516 |
| 6,149,419 A | * 11/2000 | Mizuguchi et al. | 425/183 |

FOREIGN PATENT DOCUMENTS

EP          0265740 A2    5/1988    ............ A23L/1/317

OTHER PUBLICATIONS

Berins, Michael L., "Plastics Engineering Handbook", 1991, Chapman & Hall, New York, pp. 635–655.*

USPTO Translation of Togum S.A., German Patent Application No. DE 37 30 496A1 (including also the application drawing Figures) (effective1988).

* cited by examiner

Primary Examiner—Keith Hendricks
Assistant Examiner—Drew Becker
(74) Attorney, Agent, or Firm—Winston & Strawn

(57) ABSTRACT

Multi-colored products, particularly food products, are obtained by preparing a base mixture suitable for preparing an emulsion, pumping the base material mixture to an emulsifier device and supplying a coloring solution to the emulsifier device and emulsifying the base material mixture and coloring solution to obtain a colored material mixture emulsion, passing the colored emulsion to a distribution valve which is connected to a plurality of parallel piping lines connected in series to extruders to pass differing colored emulsions to the extruders for extrusion. To obtain the differently colored products, a first coloring solution is delivered to the emulsifier device for a time, the colored emulsion is passed to the distribution valve and to one piping line and one extruder in series and then after that time, a differently colored solution is delivered to the emulsifier device to obtain a differently colored emulsion, the distributing valve is controlled to deliver the differently colored product to a second piping line and extruder in series to obtain a second differently colored product from the second extruder.

21 Claims, 1 Drawing Sheet

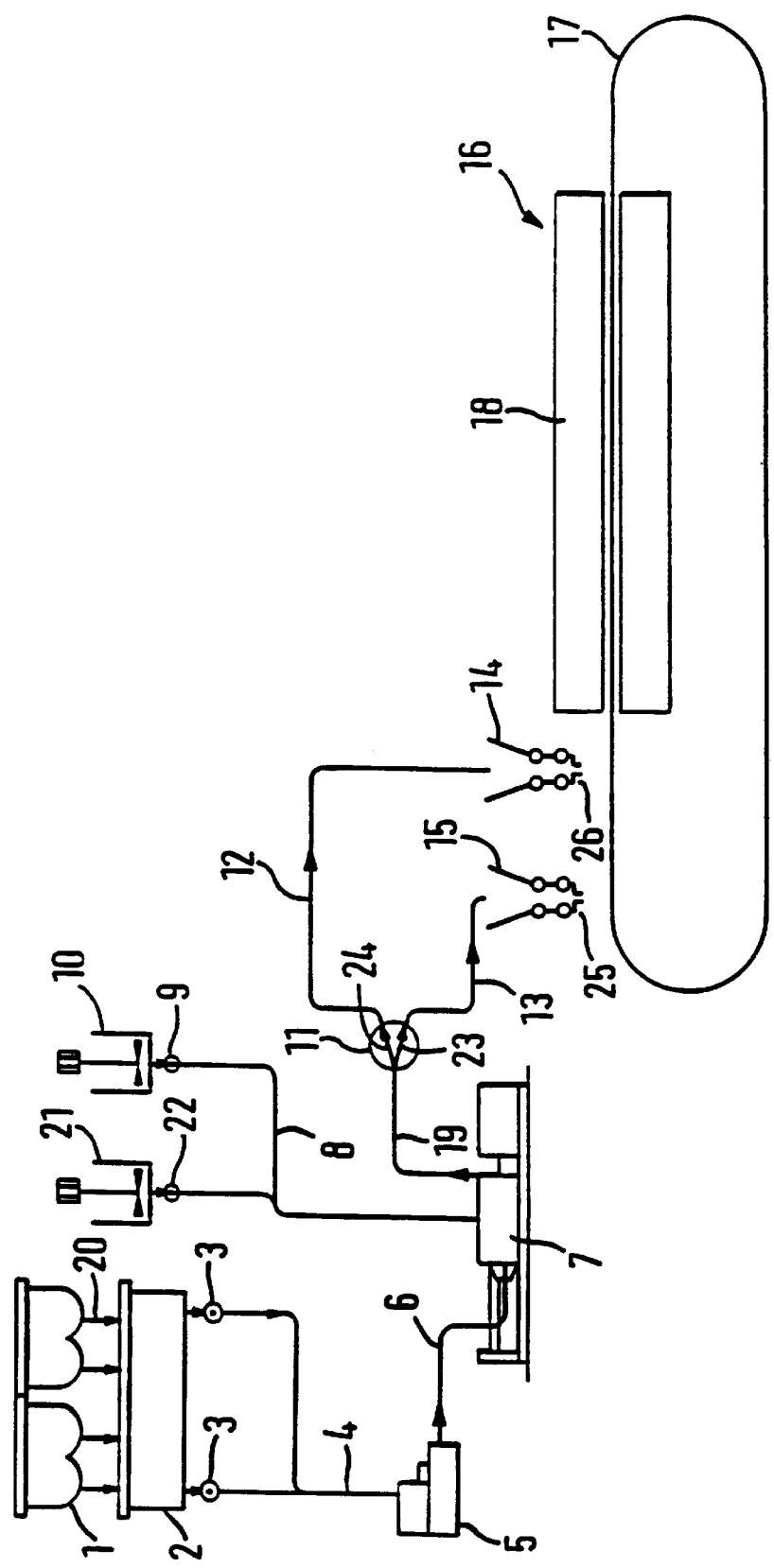

PREPARATION OF MULTI-COLORED PRODUCTS WITH A PROCESS WHICH INCLUDES EXTRUSION

CROSS-REFERENCE TO RELATED APPLICATIONS

This application is a continuation-in-part application of Application Nos. 09/010,358 and 09/208,531. The '358 application was filed on Jan. 21, 1998 and has issued as U.S. Pat. No. 6,001,402. The '531 application was filed on Dec. 9, 1998, was a divisional of the '358 Application, and has since issued as U.S. Pat. No. 6,145,433.

BACKGROUND OF THE INVENTION

The present invention relates to a preparation of multi-colored products and particularly to products which are prepared with mixing and emulsification procedures and with an extrusion procedure and more particularly to preparation of multi-colored food products which include an ingredient which provides proteins for product coagulation.

European Patent Application Publication No. 0 265 740 describes a process for preparing food product pieces, wherein a meat emulsion is prepared by subjecting it to a heat treatment to effect coagulation of the proteins present. To effect the coagulation, a certain content of proteins is required which, however, is costly in the context of the starting raw materials.

U.S. Pat. No. 5,538,748 describes means which for introducing fluid substances, including colorants, into an extrudate, and a plurality of extrudate streams may be treated to obtain, simultaneously, multi-colored extrudate product.

U.S. Pat. No. 5,165,949 describes means for simultaneously obtaining extrudates which differ in some manner one from another by means of separating an extrudate into a plurality of extrudate streams, and in a case of obtaining multi-colored extrudate product, differing colorants are added to separate streams.

U.S. Pat. No. 5,019,404 describes means for obtaining multi-colored extrudate product by reason of employing a multi-orifice extrusion system.

SUMMARY OF THE INVENTION

An object of the present invention is to provide a process for preparing and obtaining a multi-colored products, particularly, food products.

A particular object of the present invention is to provide a process for preparing and obtaining a cooked, but yet, moist multi-colored product for providing a food product, particularly a pet food, in a manner in which the cost of the raw material used is reduced, while still achieving a high quality product, and in particular, a product having a texture of high quality.

To those ends, the present invention comprises:
pumping a base material mixture, which is suitable for preparing an emulsion which is extrudable, to an emulsifier device and supplying a coloring solution to the emulsifier device and emulsifying the base material mixture and coloring solution in the emulsifier device to obtain a colored material mixture emulsion;
passing the colored material emulsion from the emulsifier device to a distribution valve which is connected to a plurality of parallel piping lines and extruders, wherein each piping line is connected in series to one of the plurality of extruders, and distributing the colored material emulsion via the valve to the extruders via the piping lines and passing the distributed colored emulsion through and out of the extruders to obtain extruded colored product from the extruders; and
collecting the colored product from the extruders; and
further, with respect to the supplying, emulsifying, distributing and extruding, comprising:
firstly supplying, for a time t, a first coloring solution to the emulsifier device for addition to the base material mixture to obtain a first colored material emulsion and passing the first colored emulsion to the distribution valve and distributing the first colored emulsion from the valve via one piping line connected to one extruder for extrusion through and out of the one extruder to obtain a first colored extruded product from the one extruder;
secondly, after time t, delivering for a time t, a second coloring solution to the emulsifier device for addition to the base material mixture to obtain a second colored material emulsion which is colored differently from the first colored emulsion and passing the second colored emulsion to the S distribution valve and controlling the distribution valve so that the second colored emulsion is delivered from the valve via a second piping line connected to a second extruder for extrusion through and out of the second extruder to obtain a second colored extruded product from the second extruder; and
wherein the time for extrusion of colored product through and out of the extruders to empty the extruders is at least equal to the total number of differing colors employed minus 1 times t so that differing colored products are obtained simultaneously from the extruders.

In a particular embodiment the base material mixture is comprised of a mixture of ingredient materials for preparing edible products and particularly, materials which comprise cereal, fat and water, and more particularly for preparing a pet food product, the ingredient materials may comprise materials selected from the group consisting of meat and meat by-products and further comprise cereal, fat and water ingredient materials, the base mixture being obtained by mixing such materials.

Additionally, in each embodiment, the extruded colored product may be further processed. The extruded colored product may be extruded to means, particularly onto such as a conveyor, for transporting it for the further processing, and when the base material mixture is comprised of edible materials, the processing further may comprise heating the extrudate, particularly to cook it, by means which include conveying the extrudate through a steam oven, which is particularly effective for obtaining a moist, cooked pet food product, or it may be cooked with an oven including, in particular, a gas-fired oven, be it a convection and/or conduction oven, or it may be heated and/or cooked with means equivalent therewith.

DETAILED DESCRIPTION OF THE INVENTION

In this description and claims, all percentages are by weight based upon the base mixture weight.

According to the present invention, it is possible to obtain a product having various colors. Addition of the coloring solution takes place by injection into the base mixture in an emulsifying device, such as while the base mixture is passing through the emulsifying device. A time t is provided for injecting a first colorant in order to color a mass m 1, then the supply of this colorant is cut off and a second colorant is supplied for a time t in order to color a new mass m 2, and so on, depending on the number of differing coloring solutions employed. The colorant addition time t is between 0.1 and 600 seconds and is preferably between 0.1 and 300 seconds.

According to the process of the invention, at least two or three differing coloring solutions are employed. The type of colorants used is not critical, and in the case of food products, all that is required is that the colorants be compatible with a food. One such colorant is, for example, haemoglobin. Additionally, the amount of coloring solution is not critical and may be in an amount between 0.1 and 12%, preferably between 2 and 4%.

The colored emulsion is passed to a distribution valve which, in the case of two colorants, has two outlets. As illustrated in the drawing Figures and described further below, when a colored emulsion is supplied to the distribution valve, a distribution valve outlet feeds a mechanical extruder, and when an emulsion with different colorant is supplied, the distribution valve switches over so that a second outlet is opened to feed a second mechanical extruder. Of course, there must be a link between the distribution valve and the system for controlling the coloring solution, and when the coloring solution is changed, the output valve is switched over to the other mechanical extruder. The explanation is similar if, instead of two coloring solutions, there are three. That is, if the base mixture emulsion is colored using two colorants, a three-way valve and two mechanical extruders in parallel are used. If the base mixture is colored using three colorants, two three-way valves in series and three mechanical extruders in parallel may be used.

In practice, the distribution valve is placed as close as possible to the emulsifying device and is intended to provide complete separation of the various colored emulsions.

The mechanical extruders should never be empty so that colored products may be extruded simultaneously from the various extruders and collected such as on a conveyor belt. During the extrusions, the various extruders are recharged upstream, one after the other, depending on the coloring solution injected into the emulsifying device.

Calling "t" the time during which a colorant is injected into the emulsifying device and calling "n" the number of coloring solutions, and therefore the number of mechanical extruders, the time to empty each extruder completely should be at least equal to (n−1) t.

Depending upon the composition and character of the emulsion treated in the extruder, the colored extrudate product may be extruded in the form of pieces, or the extrudate may be cut into pieces.

In carrying out the process of the present invention to prepare a food product and particularly, a pet food product, among the raw materials used, meat or meat by-products are all the fleshy parts of slaughtered hot-blooded animals, in the fresh state or preserved by a suitable treatment, and all the products and by-products resulting from the conversion of the body or of parts of the body of hot-blooded animals. By meat is meant, in particular, the meat of chicken, rabbits, cattle or sheep, and offal. By offal is meant lung lobes and livers or kidneys. By meat by-products is meant the meal obtained from carcasses of the afore-mentioned animals. In the present description, fish and fish by-products are meant to be included in the definition of meat and meat by-products. By fish and fish by-products are meant fish or parts of fish, in the fresh state or preserved by a suitable treatment, as well as the by-products of their conversion. Salmon or sardines may be used as fish, and fish meal may be used as by-products. By cereals are meant all species of cereals, whatever their presentation, which include products obtained by the conversion of the floury portion of the cereals. It is preferable to use corn, maize, soya, or rice, as well as their flours. The definition of "cereals" also is meant to encompass plant-origin by-products and plant-protein extracts. By plant-origin by-products is meant the by-products resulting from the treatment of plant products, in particular, cereals, vegetables, pulses and oilseeds. By plant-proteinextract is meant all plant-origin products whose proteins have been concentrated by a suitable treatment.

Meat and meat by-products are used in the base mixture in an amount of between 0.1 and 50%. In the mixture obtained, it is this fraction which is the most expensive and which is therefore important to reduce.

The fat used is an oil or an animal or vegetable fat. It is present in the base mixture in an amount of from 0.1 to 25%. The water content of the base mixture is in an amount between 50 and 70%.

As referred to above, colored product may be extruded onto a conveyor belt in a form of pieces, and particularly and preferably, for preparing a moist pet food product, the pieces have a size of between 0.1 and 20 mm and are conveyed in a steam oven for cooking at a temperature of between 80 and 100° C. and so that the cooked pieces obtained have a moisture content of between 50 and 70%, after which cooked pieces may be cut up and used in a formulation with sauces, vegetables, rice, or pasta.

The invention furthermore relates to a device for the implementation of the process according to the invention and it comprises a mixer for mixing raw materials, such as meat, cereals, water and fat, for preparing a base mixture, a pump which is connected to the mixer to pump the mixture, an emulsifying device which is connected to the pump to receive pumped mixture and which has means to enable injection of coloring solutions therein into the mixture from tanks for storing the colorants, a distribution valve which connected with an outlet of the emulsifying device for distributing, alternately, differently colored emulsions, and mechanical extruders, for receiving, alternately, the differently colored emulsions for separately extruding differently colored products.

Additionally, the apparatus may comprise a cooking apparatus, particularly a steam oven having a conveyor belt onto which the extruded pieces drop.

It is also possible to use, after the mixer, a holding tank to allow good control of the flow rate and continuous product manufacture.

Preferably, the pump is a stuffer allowing the emulsifying device to be fed directly at a constant and adjustable flow rate.

The type of emulsifying device is not critical. Preferably, it is of a device of the KARL SCHNELL type or of the TRIOGNAL SIEFER type. Pipes for delivering the coloring solutions enter the emulsifying device, and injection of the coloring solutions is controlled by a valve.

BRIEF DESCRIPTION OF THE DRAWING FIGURE

The drawing FIGURE of this application diagrammatically illustrates an apparatus assembly for carrying out the process of the invention to obtain two differently colored products.

DETAILED DESCRIPTION OF THE DRAWING FIGURE

Mixer 1 is provided for mixing various ingredients, such as meat, cereals, water and fat. The mixer outlet pipes 20 are provided for feeding a storage tank 2. The pumps 3 allow the mixture obtained to be taken continuously via the pipes 4 to a stuffer 5.

The apparatus assembly illustrated also comprises an emulsifying device 7, two coloring-solution storage tanks 10 and 21, a three-way valve 11, two pipes 12 and 13 in parallel are in parallel connected with the three-way valve for supplying emulsion to, respectively, two mechanical extruders 14 and 15. The extruders are positioned for outputting extrudate onto conveyor 17 for conveying product for further processing, such as in a steam oven 16. In practice, therefore, pipelines 12 and 13 are connected in series with extruders and the plurality of pipelines and extruders are arranged, as is characterized in the art, as being in parallel so that each pipeline leads to and feeds material to one of the plurality of extruders.

In operation, the stuffer 5 feeds the emulsifying device 7 via the line 6. The mixture is emulsified and colored. To do this, the valve 22 opens the storage tank 21 for coloring solution 1 so that the solution flows via the pipe 8 and enters the emulsifying device. The valve 22 is left open for a period of 180 seconds and the emulsified mixture thus colored is conducted via the pipe 19 to the outlet 23 of the three-way valve 11 so as to feed the mechanical extruder 15 via the pipe 13. This extruder has a die 25 through which extrudate paste passes in order to form pieces which drop onto the conveyor belt 17 of the steam oven 16.

After the 180 seconds, the valve 22 is closed, and valve 9 is opened, so that coloring solution 2 from the tank 10 enters the emulsifying device 7 via the pipe 8. A link between the valves 22 and 9 and the three-way valve 11 allows the valve 11 to then be switched to the outlet 24. The emulsified mixture then passes via the pipe 12 to the mechanical extruder 14 and via the die 26 so as to output pieces which are also cooked in the steam oven 16. The pieces which emerge have a moisture content of 56%.

As already mentioned above, an object of the present invention is to be able to produce simultaneously, in a continuous fashion, a product which is comprised of two differently colored pieces. To accomplish that, the mechanical extruders 14 and 15 should be therefore never empty during operation, and for that purpose, a link is provided between the level in the hoppers of the extruders and the output of the stuffer 5, and in this case, if the level is too low, the output of the stuffer is increased, and if the level is too high, the output of the pump is decreased. Additionally, the output of the stuffer is directly related to the output of the steam oven.

As will be appreciated, it is possible, according to the present invention, to provide simultaneous production of a product having more than two colors. However, it is, in reality, difficult to exceed 4 colors.

Below, the present invention is described further with reference to an illustrative Example.

EXAMPLE

A mixture is made which is composed of 65% meat and ground meat byproducts, 25% of cereal and 10% of water and vitamin supplements. The mixture is transferred to a KARL SCHNELL emulsifying device by means of a transfer pump, 3% of coloring solution is injected into the emulsifying device to obtain internal mixing between the mixture and the coloring solution for a time t, which is determined depending on the conditions for filling and emptying the mechanical extruders and on their output, which is fixed at 3500 kg/h. The filling height in the hopper of the extruders is 0.8 m. The time to empty and fill the hopper, and the coloring-solution injection time is 288 s. The rate of colorant injection is therefore fixed at 3% of 3500 kg/hr, i.e. 105 kg/h.

The oven 16 has a cooking tunnel 18 and the pieces are cooked at a temperature of 85° C. in a time of 90 seconds. The pieces which emerge from the oven have a moisture content of 56%.

Additionally, various modifications of the present invention may be made without departure from the spirit and scope of this disclosure, and the invention may be embodied and/or practiced suitably in the absence of elements or members and/or process steps not specifically disclosed herein.

I claim:

1. A process for preparing a multi-colored product comprising;

pumping a base material mixture, which is suitable for preparing an emulsion which is extrudable, to an emulsifier device and supplying a coloring solution to the emulsifier device and emulsifying the base material mixture and coloring solution in the emulsifier device to obtain a colored material mixture emulsion;

passing the colored material emulsion from the emulsifier device to a distribution valve which is connected to a plurality of parallel piping lines and extruders, wherein each piping line is connected in series to one of the plurality of extruders, and distributing the colored material emulsion via the valve to the extruders via the piping lines and passing the distributed colored emulsion through and out of the extruders to obtain extruded colored product from the extruders; and collecting the colored product from the extruders; and further, with respect to the supplying, emulsifying, distributing and extruding, comprising:

firstly supplying, for a time t, a first coloring solution to the emulsifier device for addition to the base material mixture to obtain a first colored material emulsion and passing the first colored emulsion to the distribution valve and distributing the first colored emulsion from the valve via one piping line connected to one extruder for extrusion through and out of the one extruder to obtain a first colored extruded product from the one extruder;

secondly, after time t, delivering for a time t, a second coloring solution to the emulsifier device for addition to the base material mixture to obtain a second colored material emulsion which is colored differently from the first colored emulsion and passing the second colored emulsion to the distribution valve and controlling the distribution valve so that the second colored emulsion is delivered from the valve via a second piping line connected to a second extruder for extrusion through and out of the second extruder to obtain a second colored extruded product from the second extruder; and wherein the time for extrusion of colored product through and out of the extruders to empty the extruders is at least equal to the total number of differing colors employed minus 1 times t so that differing colored products are obtained simultaneously from the extruders.

2. A process according to claim 1 wherein there are at least three different colorants and at least three separate piping lines connected to separate extruders so that at least three differently colored extruded products are obtained and wherein the distribution valve is controlled for passing each differently colored emulsion to separate piping lines and extruders in series.

3. A process according to claim 1 wherein t is a time between 0.1 second and 600 seconds.

4. A process according to claim 1 wherein t is a time between 0.1 second and 300 seconds.

5. A process according to claim 1 wherein the base material mixture is a mixture of ingredient materials for preparing an edible product.

6. A process according to claim 1 wherein the base material mixture comprises a mixture of cereal, fat and water ingredient materials.

7. A process according to claim 1 wherein the base material mixture comprises materials selected from the group consisting of meat and meat by-product ingredient materials and further comprises cereal, fat and water ingredient materials.

8. A process according to claim 7 wherein the base material mixture has, by weight, a fat content of 0.1% to 25%, and a water content of between 50% and 70%.

9. A process according to claim 1 further comprising heating the colored product collected from the extruders to cook the collected product.

10. A process according to claim 7 or 8 further comprising collecting the product on a conveyor and conveying the collected product through a steam oven and heating the conveyed collected product in the steam oven to cook the product to obtain a cooked product.

11. A process according to claim 10 wherein the base mixture is prepared and the emulsion is extruded and the extruded colored product is heated so that the cooked product has a moisture content, by weight, of between 50% and 70%.

12. A process according to claim 7 wherein the colorant solution is supplied so that the colored emulsion obtained comprises the colorant solution in an amount by weight between 0.1% and 12%.

13. A process according to claim 1 wherein the colored products extruded from the extruders are extruded so that the colored products are extruded from extruder dies in a form of pieces.

14. A process according to claim 13 wherein the product pieces have a size dimension of between 0.1 mm and 20 mm.

15. A process according to claim 1 further comprising conveying the extruded colored product to and through a steam oven and heating the product at a temperature of between 80° C. and 100° C.

16. A process for preparing a moist multi-colored food product comprising:

mixing ingredient materials to obtain a base material mixture, wherein the materials mixed comprise materials selected from the group consisting of meat and meat by-products and further comprise cereal, fat and water ingredient materials;

pumping the base material mixture to an emulsifier device and supplying a coloring solution to the emulsifier device to obtain the base material mixture and a colorant in the emulsifier device and emulsifying the base material mixture and coloring solution in the emulsifier device to obtain a colored material mixture emulsion;

passing the colored emulsion from the emulsifier device to a distribution valve which is connected to a plurality of parallel piping lines and extruders, wherein each piping line is connected in series to one of the plurality of extruders, and distributing the colored emulsion via the valve to the extruders via the piping lines and passing the colored emulsion through and out of the extruders to obtain extruded colored product from the extruders; and further, with respect to the supplying, emulsifying, distributing and extruding, comprising:

firstly supplying, for a time t, a first coloring solution to the emulsifier device for addition to the base material mixture to obtain a first colored material emulsion and passing the first colored emulsion to the distribution valve and distributing the first colored emulsion from the valve via one piping line connected to one extruder for extrusion through and out of the one extruder to obtain a first colored extruded product from the one extruder;

secondly, after time t, delivering for a time t, a second coloring solution to the emulsifier device for addition to the base material mixture to obtain a second colored material emulsion which is colored differently from the first colored emulsion and passing the second colored emulsion to the distribution valve and controlling the distribution valve so that the second colored emulsion is delivered from the valve via a second piping line connected to a second extruder for extrusion through and out of the second extruder to obtain a second colored extruded product from the second extruder; and wherein the time for extrusion of colored product through and out of the extruders to empty the extruders is at least equal to the total number of differing colors employed minus 1 times t so that differing colored products are extruded and deposited simultaneously onto the conveyor for conveying.

17. A process according to claim 16 wherein there are at least three different colorants and at least three separate piping lines connected to separate extruders so that at least three differently colored extruded products are obtained and wherein the distribution valve is controlled for passing each differently colored emulsion to separate piping lines and extruders in series.

18. A process according to claim 16 wherein t is a time between 0.1 second and 600 seconds.

19. A process according to claim 16 or 17 wherein t is a time between 0.1 second and 300 seconds.

20. A process according to claim 16 wherein the materials are mixed so that the base material mixture has, by weight, a fat content of between 0.1% and 25% and a water content of between 50% and 70% and wherein the materials are mixed, the emulsion is extruded and heated the colored product is so that the steam-heated product has a moisture content, by weight, of between 50% and 70%.

21. A process according to claim 20 wherein the colorant solution is supplied so that the colored emulsion obtained comprises the colorant solution in an amount by weight between 0.1% and 12%.

* * * * *

UNITED STATES PATENT AND TRADEMARK OFFICE
CERTIFICATE OF CORRECTION

PATENT NO.   : 6,358,547 B1                                             Page 1 of 1
DATED        : March 19, 2002
INVENTOR(S)  : Dupont It is certified that error appears in the above-identified patent and that said Letters Patent is hereby corrected as shown below:

<u>Title page,</u>
Item [75], Inventor: change "Salouel" to -- Salovel --.

Item [63], Related U.S. Application Data, please change the related U.S. application data to read as follows:

-- Continuation-in-part of application No. 09/010,358, filed on Jan. 21, 1998, now Pat. No. 6,001,402; and a continuation-in-part of application No. 09/208,531, filed on Dec. 9, 1998, now Pat. No. 6,145,433; which is a divisional of said application No. 09/010,358. --

Signed and Sealed this

Tenth Day of September, 2002

Attest:

*Attesting Officer*

JAMES E. ROGAN
*Director of the United States Patent and Trademark Office*